United States Patent
Niwa (10) Patent No.: US 9,792,107 B2
(45) Date of Patent: Oct. 17, 2017

(54) IMAGE FORMING APPARATUS THAT PERFORMS FIRMWARE UPDATE, CONTROL METHOD THEREFOR, AND STORAGE MEDIUM

(71) Applicant: CANON KABUSHIKI KAISHA, Tokyo (JP)

(72) Inventor: Koji Niwa, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 368 days.

(21) Appl. No.: 14/589,445

(22) Filed: Jan. 5, 2015

(65) Prior Publication Data
US 2015/0199194 A1    Jul. 16, 2015

(30) Foreign Application Priority Data
Jan. 10, 2014 (JP) ................. 2014-003220

(51) Int. Cl.
G06F 9/44      (2006.01)
G06F 9/445     (2006.01)

(52) U.S. Cl.
CPC ........... *G06F 8/65* (2013.01); *G06F 8/665* (2013.01); *G06F 8/68* (2013.01)

(58) Field of Classification Search
None
See application file for complete search history.

(56) References Cited

U.S. PATENT DOCUMENTS 7,954,098 B1* 5/2011 Martin .............. G06F 8/61
                                                   717/176
2008/0263540 A1* 10/2008 Bando .............. G06F 8/68
                                                   717/173

FOREIGN PATENT DOCUMENTS

JP       2011242891 A    12/2011

* cited by examiner

*Primary Examiner* — Lewis A Bullock, Jr.
*Assistant Examiner* — Mark Gooray
(74) *Attorney, Agent, or Firm* — Rossi, Kimms & McDowell LLP

(57) ABSTRACT

An image forming apparatus which is capable of preventing firmware from being updated to firmware with wrong specifications regardless of specifications of the firmware. The image forming apparatus is able to communicate with a server apparatus and has plural pieces of firmware for performing at least one function. The plural pieces of firmware are updated to update firmware corresponding thereto. Version information and characteristic information on the plural pieces of firmware, and version information and characteristic information on the update firmware are obtained from a server apparatus. The update firmware having a difference from the plural pieces of firmware in terms of the version information is identified and obtained from the server apparatus. When the identified update firmware has the characteristic information, a display screen indicates that the characteristic information will not be maintained and prompts a user to choose whether or not to perform an update.

6 Claims, 11 Drawing Sheets

| COMBINATION INFORMATION ON FIRMWARE | | | |
|---|---|---|---|
| MAIN BODY CONTROLLER | | | |
| MODULE NAME | VERSION | TSF INFORMATION | FIRMWARE TO BE DEPENDED ON |
| OS | 1.0 | | |
| UI | 1.0 | | OS, LOG SCAN, PRINT |
| SCAN | 1.0 | | OS, LOG |
| PRINT | 1.0 | | OS, LOG |
| N/W | 1.2 | SECURITY | OS, LOG |
| UPDATE | 1.0 | | OS |
| LOG | 1.0 | | OS |
| PRINTER UNIT PROGRAM | | | |
| DCON | 1.0 | | |

FIG. 7B

| COMBINATION INFORMATION ON FIRMWARE ||||
|---|---|---|---|
| MAIN BODY CONTROLLER ||||
| MODULE NAME | VERSION | TSF INFORMATION | FIRMWARE TO BE DEPENDED ON |
| OS | 1.0 | | |
| UI | 1.0 | | OS, LOG SCAN, PRINT |
| SCAN | 1.0 | | OS, LOG |
| PRINT | 1.0 | | OS, LOG |
| N/W | 1.2 | SECURITY | OS, LOG |
| UPDATE | 1.0 | | OS |
| LOG | 2.0 | | OS |

| PRINTER UNIT PROGRAM |||
|---|---|---|
| DCON | 1.0 | |

FIG. 7C

| COMBINATION INFORMATION ON FIRMWARE | | | |
|---|---|---|---|
| MAIN BODY CONTROLLER | | | |
| MODULE NAME | VER-SION | TSF INFOR-MATION | FIRMWARE TO BE DEPENDED ON |
| OS | 1.0 | | |
| UI | 1.0 | | OS, LOG SCAN, PRINT |
| SCAN | 2.0 | | OS, LOG |
| PRINT | 2.0 | | OS, LOG |
| N/W | 1.2 | SECU-RITY | OS, LOG |
| UPDATE | 1.0 | | OS |
| LOG | 1.0 | | OS |
| PRINTER UNIT PROGRAM | | | |
| DCON | 1.0 | | |

IMAGE FORMING APPARATUS THAT PERFORMS FIRMWARE UPDATE, CONTROL METHOD THEREFOR, AND STORAGE MEDIUM

BACKGROUND OF THE INVENTION

Field of the Invention

The present invention relates to an image forming apparatus, a control method therefor, and a storage medium, and in particular to an image forming apparatus that performs a firmware update, a control method therefor, and a storage medium.

Description of the Related Art

An update technique that updates firmware, which is executed by an image forming apparatus, using an update program, and a difference update technique that, when firmware for an image forming apparatus is comprised of multiple modules, updates only necessary modules among a the plurality of modules are known.

In recent years, the number of image forming apparatuses connected to an update program distribution server via a network has been increasing, and in some forms, to update firmware for an image forming apparatus, applicable firmware is selected from many pieces of firmware registered in a server, and an update program corresponding to the selected firmware is obtained.

Moreover, some firmware for image forming apparatuses mentioned above have functions added for specific users or have special specifications customized so as to establish stricter security specifications, and a proper update is required to be performed for the firmware with the special specifications as well. Accordingly, for example, there has been proposed a technique that determines whether or not to update firmware based on the dependency relationship between programs distributed from a server and programs installed individually without being distributed from the server among programs of firmware (see, for example, Japanese Laid-Open Patent Publication (Kokai) No. 2011-242891).

According to the technique described in Japanese Laid-Open Patent Publication (Kokai) No. 2011-242891, however, it is not determined whether or not a program distributed from a server among programs of firmware is a customized program with special specifications or a program with normal specifications. Thus, when downloading firmware from the server and transferring the same to an image forming apparatus, a user has to check if the firmware for the image forming apparatus is customized firmware with special specifications. Further, even when a serviceperson visits a user and updates firmware, firmware with special specifications mentioned above is updated to firmware with normal specifications due to human error, and as a result, security specifications of the firmware may not be maintained.

SUMMARY OF THE INVENTION

The present invention provides an image forming apparatus and a control method therefor which are capable of preventing firmware from being updated to firmware with wrong specifications regardless of specifications of the firmware, as well as a storage medium.

Accordingly, a first aspect of the present invention provides an image forming apparatus, comprising a first obtaining unit configured to obtain version information on a plural pieces of firmware and obtain version information on update firmware corresponding to each of the plural pieces of firmware from an information processing apparatus via a network, an identifying unit configured to identify the update firmware having a difference from the plural pieces of firmware in terms of the version information, a second obtaining unit configured to obtain the identified update firmware from the information processing apparatus via the network, a determination unit configured to determine whether the identified update firmware has characteristic information and a display control unit configured to, when the identified update firmware has the characteristic information, provide control to display that the characteristic information will not be maintained.

Accordingly, a second aspect of the present invention provides a control method for an image forming apparatus, comprising a first obtaining step of obtaining version information on a plural pieces of firmware and obtaining version information on update firmware corresponding to each of the plural pieces of firmware from an information processing apparatus via a network, an identifying step of identifying the update firmware having a difference from the plural pieces of firmware in terms of the version information, a second obtaining step of obtaining the identified update firmware from the information processing apparatus via the network, a determination step of determining whether the identified update firmware has characteristic information, and a display control step of, when the identified update firmware has the characteristic information, providing control to display that the characteristic information will not be maintained.

Accordingly, a third aspect of the present invention provides a non-transitory computer-readable storage medium storing a program for causing a computer to execute a control method for an image forming apparatus, the control method comprising a first obtaining step of obtaining version information on a plural pieces of firmware and obtaining version information on update firmware corresponding to each of the plural pieces of firmware from an information processing apparatus via a network, an identifying step of identifying the update firmware having a difference from the plural pieces of firmware in terms of the version information, a second obtaining step of obtaining the identified update firmware from the information processing apparatus via the network, a determination step of determining whether the identified update firmware has characteristic information, and a display control step of, when the identified update firmware has the characteristic information, providing control to display that the characteristic information will not be maintained.

According to the present invention, when firmware likely to be updated is firmware having characteristic information or firmware having a dependency relationship with firmware having characteristic information, the screen indicates that a secure state will not be maintained. This prevents firmware from being updated to firmware with wrong specifications regardless of specifications of the firmware.

Further features of the present invention will become apparent from the following description of exemplary embodiments (with reference to the attached drawings).

BRIEF DESCRIPTION OF THE DRAWINGS

FIGS. 4A to 4C are diagrams useful in explaining combination information on firmware for use in the firmware update process in FIG. 3, in which

FIGS. 7A to 7C are diagrams useful in explaining combination information on firmware for use in the firmware update process in FIG. 6, in which

DESCRIPTION OF THE EMBODIMENTS

The present invention will now be described in detail with reference to the drawings showing an embodiment thereof.

Figure 1:
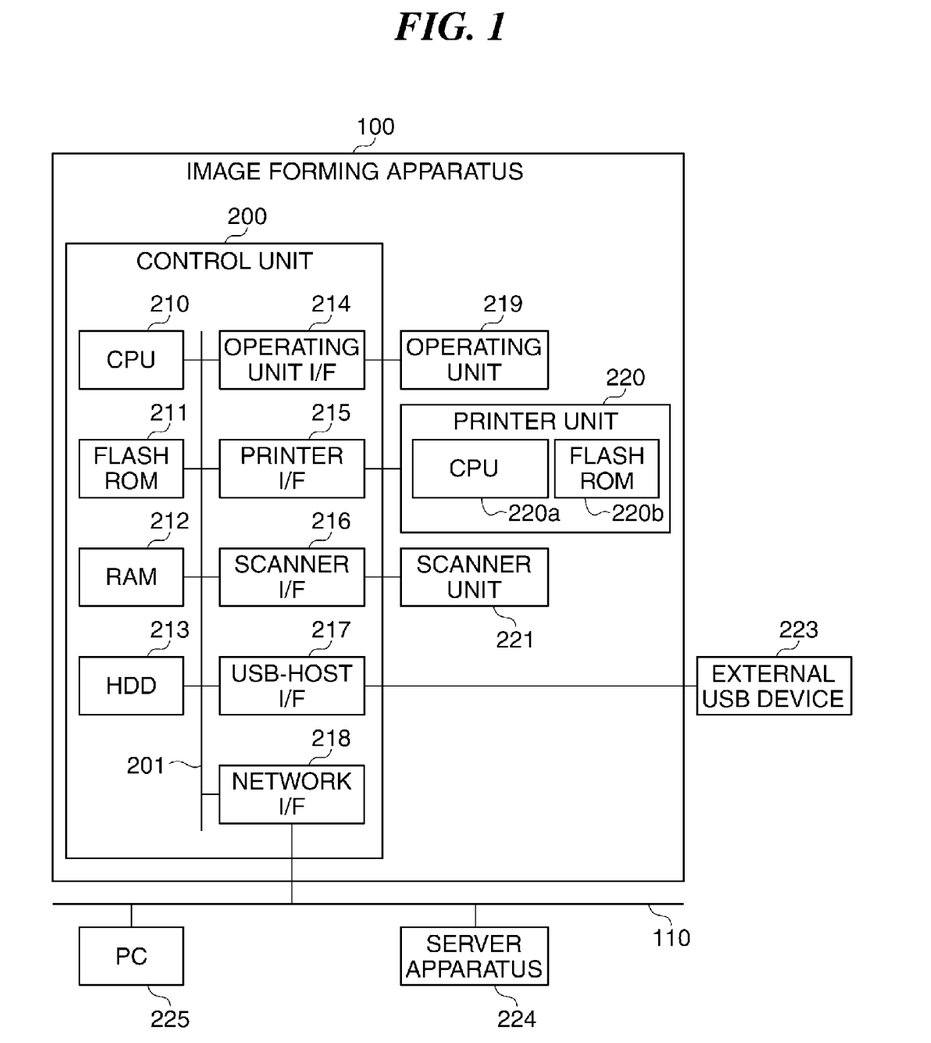
FIG. 1 is a block diagram schematically showing an arrangement of an image forming system having an image forming apparatus according to an embodiment of the present invention.

FIG. 1 is a block diagram schematically showing an arrangement of an image forming system having an image forming apparatus 100 according to an embodiment of the present invention.

The image forming system in FIG. 1 is comprised of the image forming apparatus 100, a PC 225, and a server apparatus 224, which are connected one another via a LAN 110.

The image forming apparatus 100 has a control unit 200, an operating unit 219, a printer 220, and a scanner 221.

The control unit 200 has a CPU 210, a flash ROM 211, a RAM 212, an HDD 213, an operating unit I/F 214, a printer I/F 215, a scanner I/F 215, a USB-Host I/F 217, and a network I/F 218, which are connected to one another via a bus 201.

The operating unit 219, the printer 220, the scanner 221, and an external USB device 223 are connected to the operating unit I/F 214, the printer I/F 215, the scanner I/F 216, and the USB-Host I/F 217, respectively, and the PC 225 and the server apparatus 224 are connected to the network I/F 218 via the LAN 110.

The CPU 103 loads programs for the control unit 200, which are stored in the flash ROM 211, into the RAM 212 and executes them.

The HDD 213 stores print data received from the PC 225 via the network I/F 218 and also stores image data that is converted from print data stored in the HDD 213 and made printable by the CPU 210 executing a print application program.

The operating unit 219 displays an input screen that prompts a user of the image forming apparatus 100 to choose an instruction, and the CPU 210 causes the operating unit 219 to switch display screens based on instructions selected by the user.

The printer unit 220 has a CPU 220a and a flash ROM 220b, and the CPU 220a causes the printer unit 220 to carry out a printing process in which it performs printing on sheets based on image data transferred from the HDD 213 via the printer I/F 215.

The CPU 210 executing a scanning application program causes the scanner unit 221 to read an image off an original as image data using a line sensor comprised of a CCD or the like. The scanner unit 221 transfers the read image data to the HDD 213 via the scanner I/F 216. The printer unit 220 is also able to print and copy the read image data.

The external USB device 223 is, for example, a USB memory or a USB keyboard. Update firmware is allowed to be stored in the USB memory and downloaded into the image forming apparatus 100 to update firmware.

The server apparatus 224 (information processing apparatus), which is capable of carrying out network communications with the image forming apparatus 100 via the LAN 110, stores update information for updating various types of firmware, to be described later, which are executed by the image forming apparatus 100 (see FIGS. 4A to 4C and FIGS. 7A to 7C), and in response to a request from the image forming apparatus 100, sends update information to the image forming apparatus 100.

Figure 2:
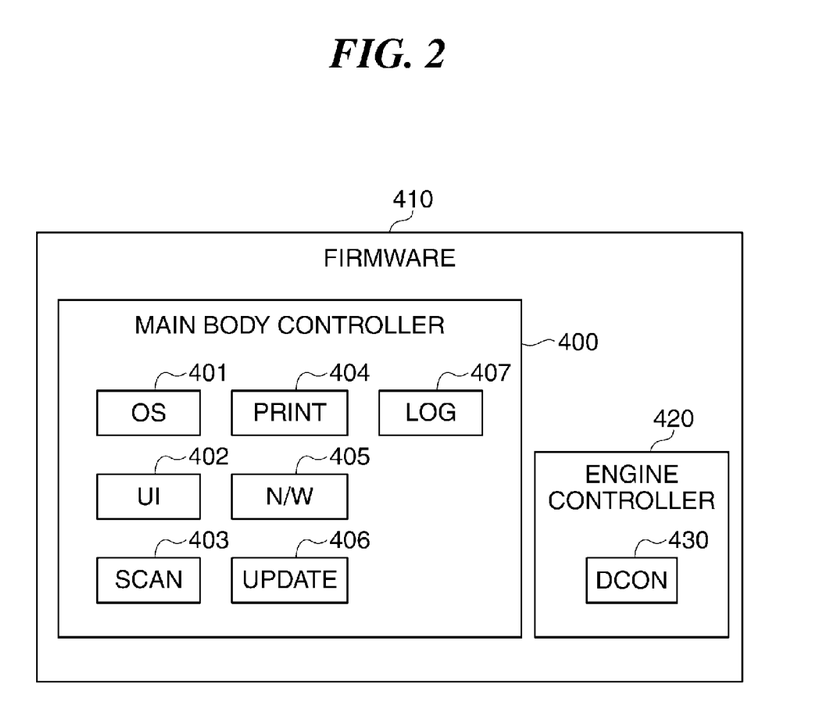
FIG. 2 is a diagram useful in explaining an arrangement of firmware for the image forming apparatus in FIG. 1.

FIG. 2 is a diagram useful in explaining an arrangement of firmware 410 for the image forming apparatus 100 in FIG. 1.

Referring to FIG. 2, the firmware 410 for the image forming apparatus 100 is comprised of a main body controller 400 that is usually used by the user, and an engine controller 420 for the printer unit 220.

The main body controller 400 is comprised of an OS module 401, a UI module 402, a scan module 403, a print module 404, an N/W module 405, an update module 406, and a log module 407 and stored in the flash ROM 211. The engine controller 420 is comprised of a DCON module 430 and stored in the flash ROM 220b of the printer unit 220.

The OS module 401 is an OS for controlling the image forming apparatus 100 and is firmware for controlling operation of programs in the image forming apparatus 100 including the printer unit 220 and the scanner unit 221. The UI module 402 is firmware for transmitting an instruction input via the operating unit 219 by the user of the image forming apparatus 100 to the CPU 210 and causing the CPU 210 to perform processing in accordance with the transmitted instruction.

The scan module 403 is firmware for controlling scanning performed by the scanner unit 221. The print module 404 is firmware for controlling printing performed by the printer unit 220. The N/W module 405 is firmware for carrying out communications with the PC 225 and the server apparatus 224 via the LAN 110. The update module 406 is firmware for updating the firmware in FIG. 2. The log module 407 is firmware for recording operation logs of the firmware of the main body controller 400 in the HDD 213 or the like.

The firmware 410 described above is merely exemplary firmware for the image forming apparatus 100 and may be internally comprised of a plurality of finer sub programs. Also, there may be firmware other than the firmware described above.

Figure 3:
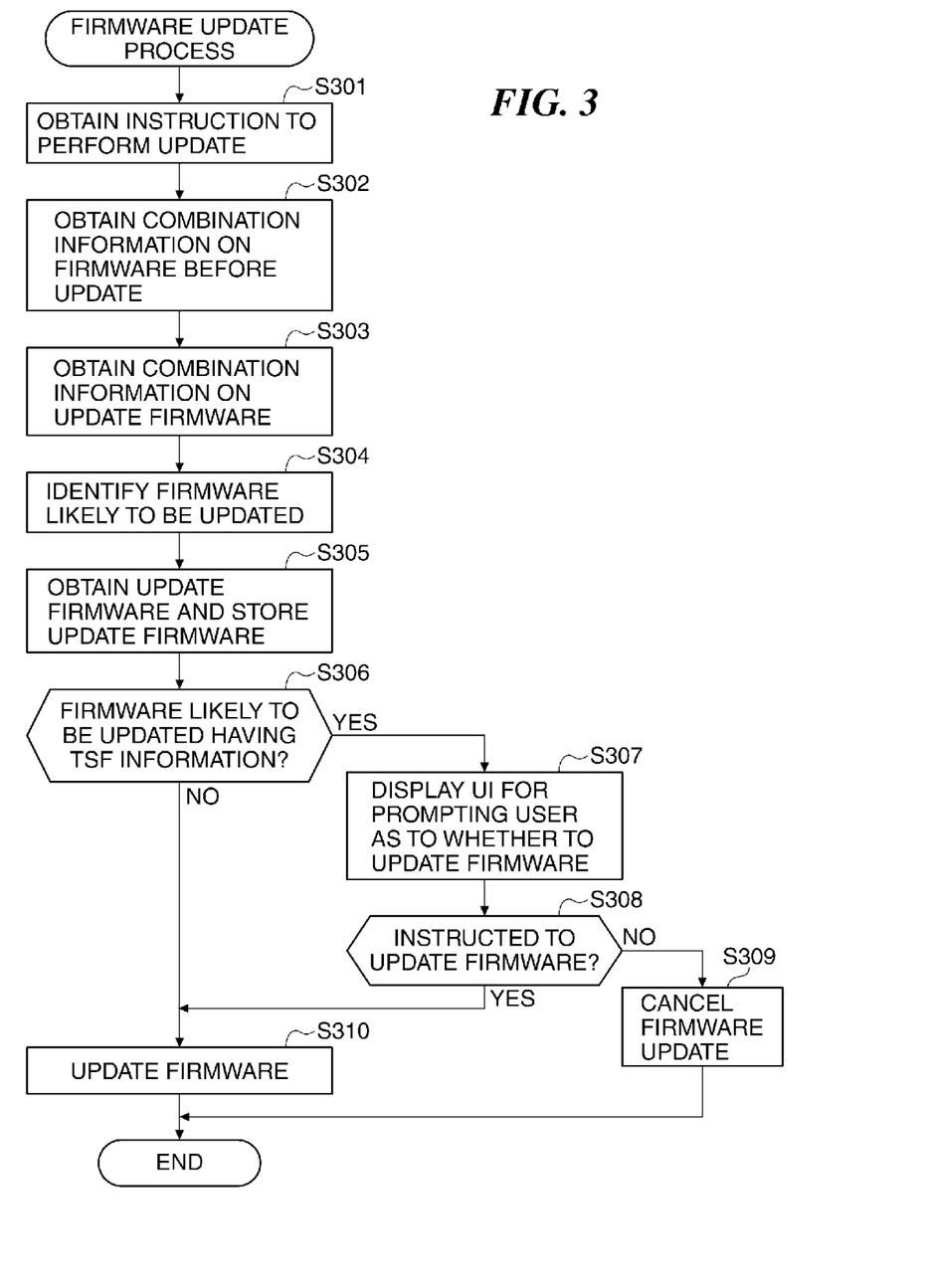
FIG. 3 is a flowchart showing the procedure of a firmware update process carried out by the image forming apparatus in FIG. 1.

FIG. 3 is a flowchart showing the procedure of a firmware update process carried out by the image forming apparatus 100 in FIG. 1.

The firmware update process in FIG. 3 is carried out by the CPU 210 executing firmware stored in the flash ROM 211.

Referring to FIG. 3, first, the CPU 210 receives input information from the user via the operating unit 210 or communication information from the PC 225 or the server apparatus 224 to obtain an instruction to update firmware for the image forming apparatus 100 (step S301) and obtains version information on each piece of firmware before update, which is stored in the flash ROM 211 or the flash ROM 220b, and combination information on TSF (TOE security functionality) information (characteristic information) (FIG. 4A) from the server apparatus 224 (step S302) (first obtaining unit).

The TSF information is added to firmware playing a role in ensuring security when security specifications are more rigorously established. For example, in combination information on firmware before update (FIG. 4A), the N/W module 405 is firmware playing a role in ensuring security, and hence "security" is added as TSF information to the N/W module 405.

The CPU 210 then obtains version information on each piece of update firmware and combination information on TSF information (FIG. 4B) from the server apparatus 224 (step S303) (first obtaining unit), compares the combination information on firmware before update obtained in the step S302 with the combination information on update firmware obtained in the step S303, and identifies update firmware having a difference in version information on firmware as firmware likely to be updated (step S304) (identifying unit).

The CPU 210 obtains update firmware required to update firmware which is likely to be updated and identified in the step S304 from the server apparatus 224 (second obtaining unit) and stores the obtained update firmware in the image forming apparatus 100 (for example, the HDD 213) (step S305). Based on the combination information on update firmware obtained in the step S303, the CPU 210 determines whether or not the firmware likely to be updated is firmware having TSF information (step S306) (determination unit).

Figure 4A:
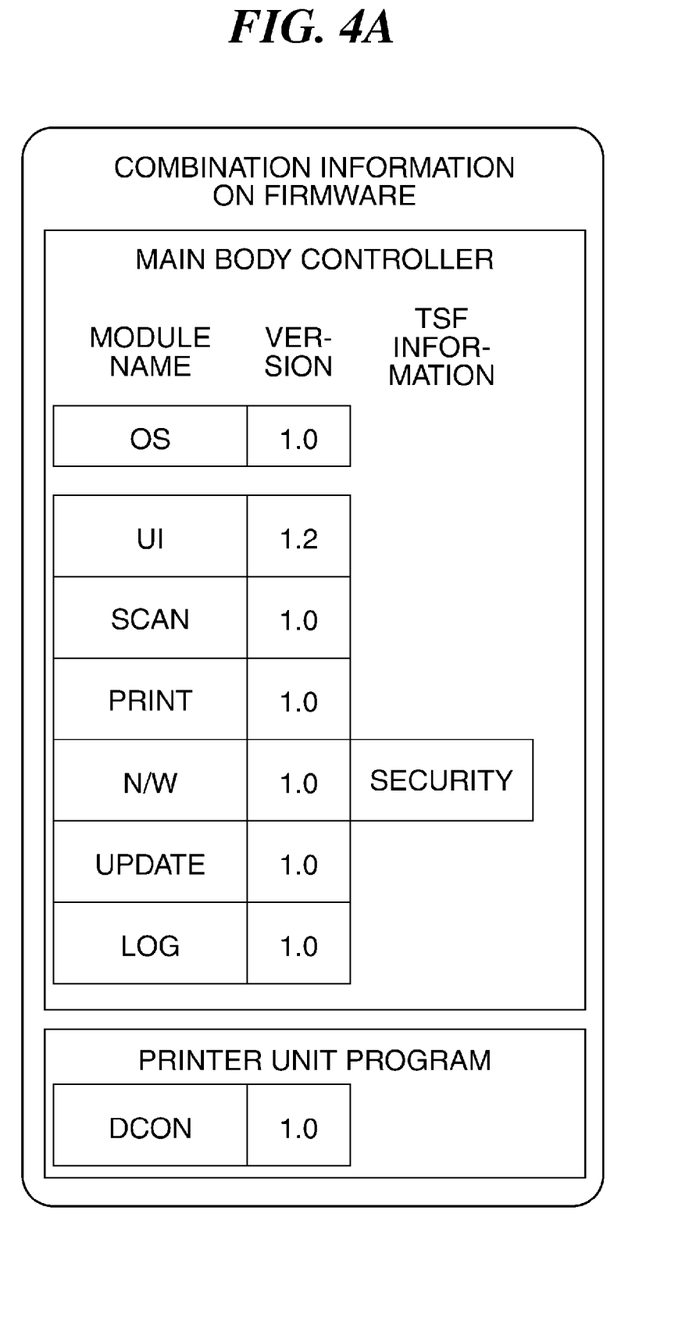
FIG. 4A shows combination information on firmware before update.
Figure 4B:
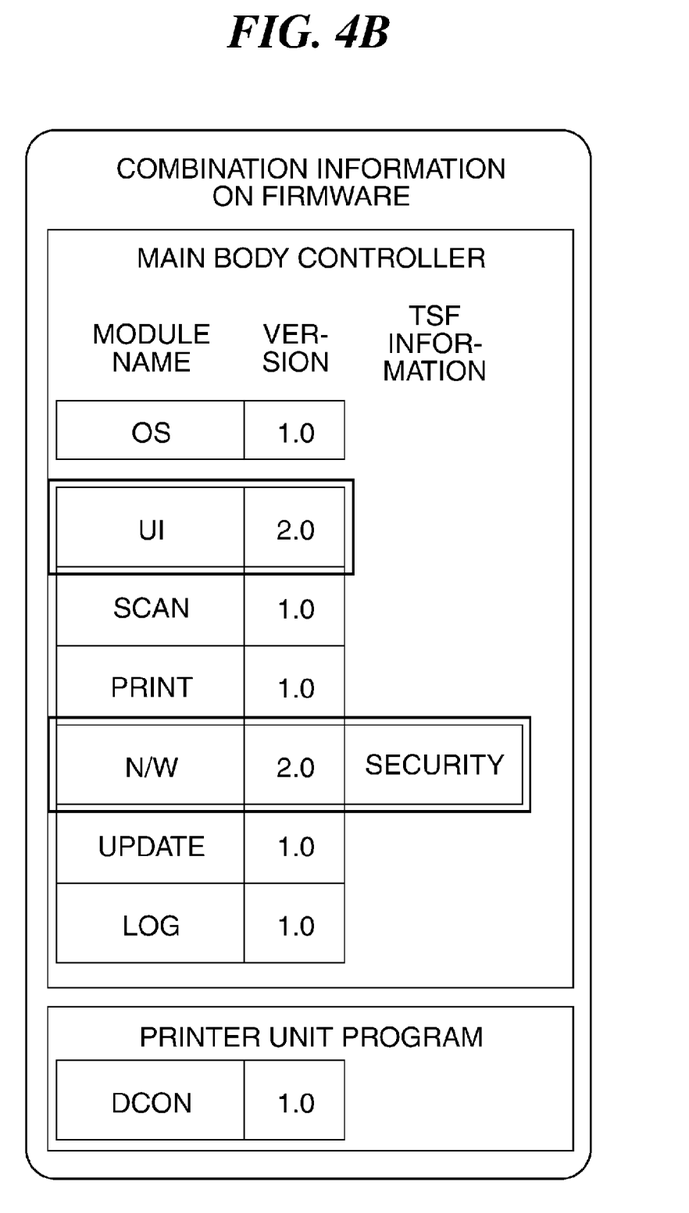
FIG. 4B shows combination information on update firmware when firmware having TSF information is for update.

In the identification in the step S304 and the determination in the step S306, when, for example, the combination information on update firmware in FIG. 4B is used, the CPU 210 compares in the step S304 the combination information on firmware before update (FIG. 4A) with the combination information on update firmware (FIG. 4B). Since version information on the UI module 402 is different, i.e. 1.2 and 2.0, and version information on the N/W module 405 is different, i.e. 1.0 and 2.0, the CPU 210 identifies the UI module 402 and the N/W module 405 as firmware likely to be updated.

Further, in the step S306, in the combination information on update firmware (FIG. 4B), TSF information is added to the N/W module 405, and hence the CPU 210 determines that the N/W module 405, which is firmware likely to be updated, is firmware having TSF information.

Figure 4C:
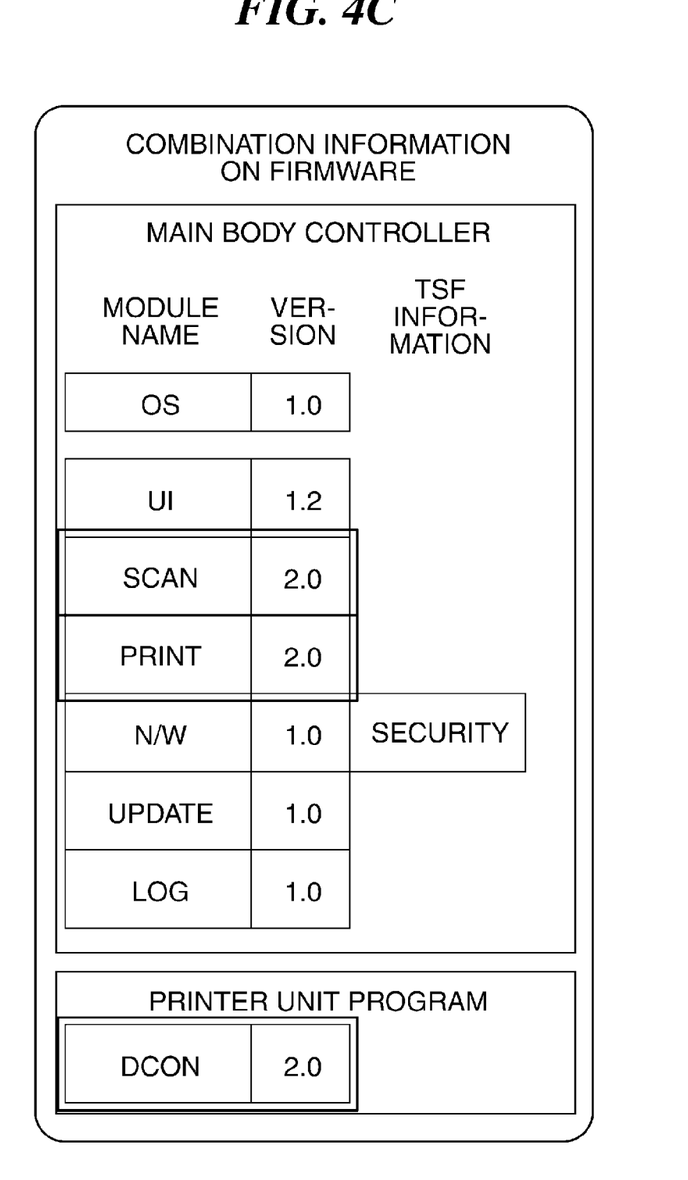
FIG. 4C shows combination information on update firmware when firmware having TSF information is not for update.

In the identification in the step S304 and the determination in the step S306, when, for example, the combination information on update firmware in FIG. 4B is used, the CPU 210 compares in the step S304 the combination information on firmware before update (FIG. 4A) with combination information on update firmware (FIG. 4C). Since version information on the scan module 403, the print module 404, and the DCON module 430 is different, i.e. 1.0 and 2.0, the CPU 210 identifies the scan module 403, the print module 404, and the DCON module 430 as firmware likely to be updated.

Further, in the step S306, in the combination information on update firmware (FIG. 4C), TSF information is added to the N/W module 405, and hence the CPU 210 determines that none of the scan module 403, the print module 404, and the DCON module 430, which are firmware likely to be updated, is firmware having TSF information.

As a result of the determination in the step S306, when firmware likely to be updated is firmware having TSF information (YES in the step S306), the CPU 210 causes the operating unit 210 to display a UI (FIG. 5) indicating that the secure state will not be maintained and prompting the user to choose whether or not to update firmware (step S307) (display control unit), and determines whether or not the user has issued an instruction to update firmware via the operating unit 219 (step S308). In the step S308, the instruction to update firmware is issued by the user depressing an update button 501 or a cancel button 502 (FIG. 5) to choose whether to update firmware or cancel firmware update.

Figure 5:
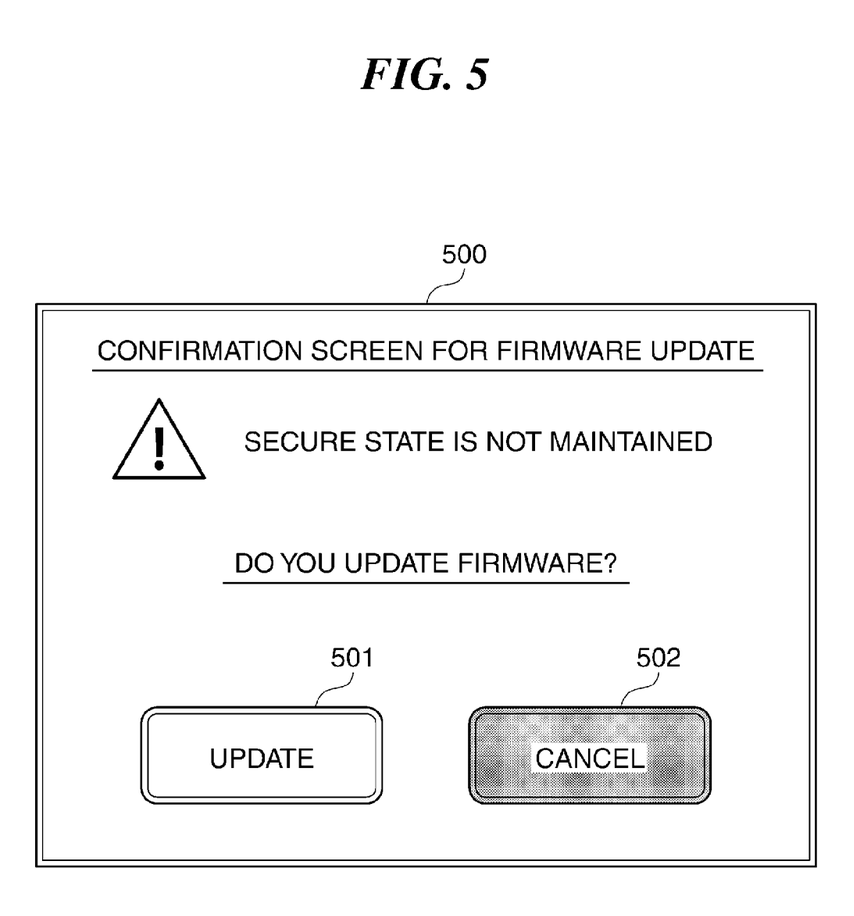
FIG. 5 is a view showing an exemplary UI displayed on an operating unit in FIG. 1.

On the other hand, as a result of the determination in the step S308, when the user has issued an instruction to cancel firmware update by depressing the cancel button 502 (NO in the step S308), the CPU 210 deletes the update firmware obtained in the step S305 and cancels firmware update (step S309), followed by terminating the present process.

As a result of the determination in the step S306, when firmware likely to be updated is not firmware having TSF information (NO in the step S306), or as a result of the determination in the step S308, when the user has issued an instruction to update firmware (YES in the step S308), the CPU 210 causes the OS module 401 to execute the update module 406 and update firmware before update which corresponds to update firmware having a difference in version information among firmware before update to the update firmware obtained in the step S305 (step S310) (update unit) and terminates the present process.

It should be noted that in the process in FIG. 3, when firmware likely to be updated is not firmware having TSF information (NO in the step S306), the CPU 210 may cause the operating unit 219 to indicate that the secure state will be maintained and perform a firmware update in the step S310.

According to the process in FIG. 3, when firmware likely to be updated is firmware having TSF information (YES in the step S306), the CPU 210 causes the operating unit 210 to display the UI (FIG. 5) indicating that the secure state will not be maintained and prompting the user to choose whether or not to update firmware (step S307). This prevents firmware from being updated to firmware with wrong specifications irrespective of firmware specifications.

Figure 6:
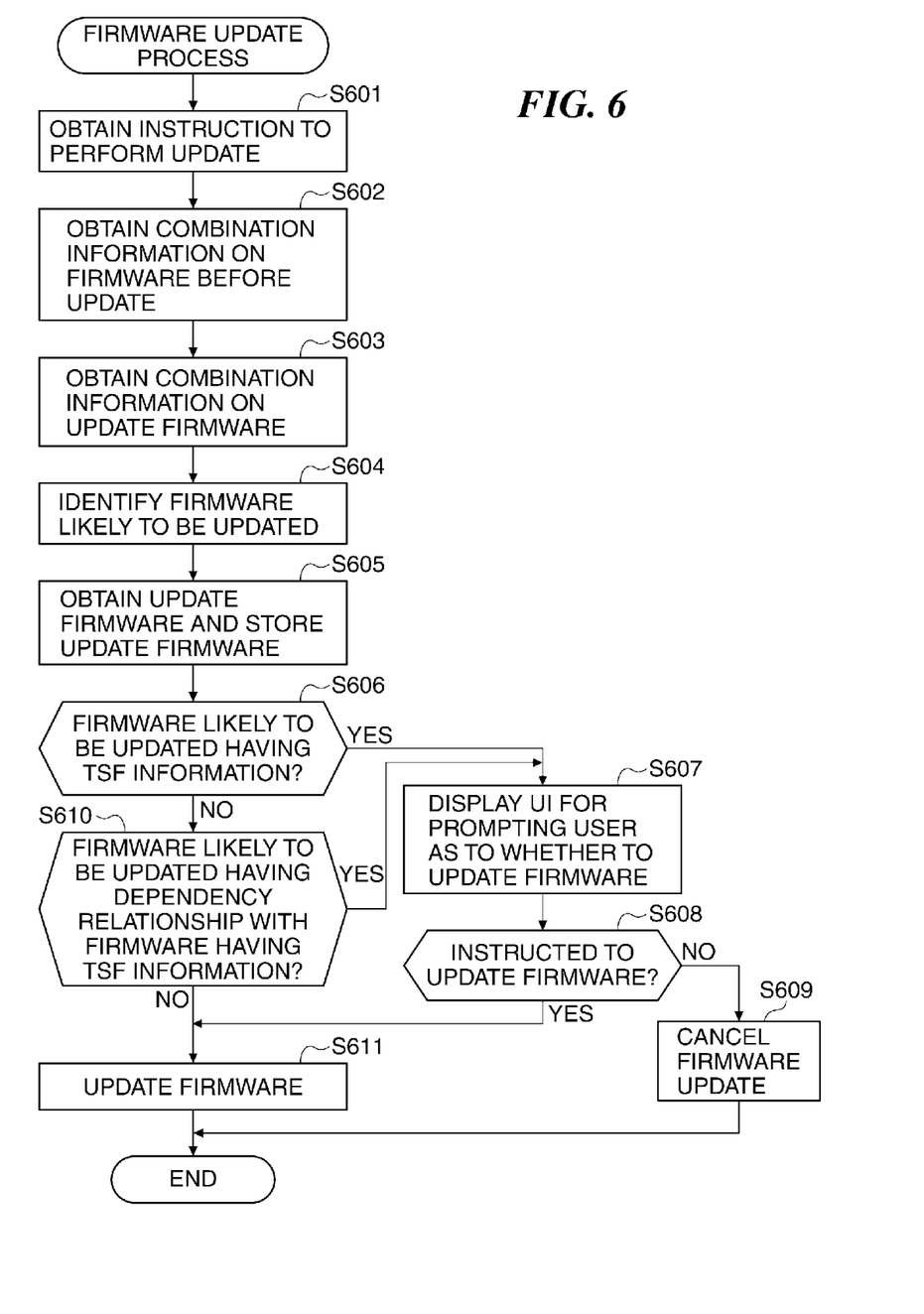
FIG. 6 is a flowchart showing the procedure of a variation of the firmware update process in FIG. 3.

FIG. 6 is a flowchart showing the procedure of a variation of the firmware update process in FIG. 3.

The firmware update process in FIG. 6 is carried out by the CPU 210 executing firmware stored in the flash ROM 211.

Referring to FIG. 6, first, the CPU 210 receives input information from the user via the operating unit 219 or communication information from the PC 225 or the server apparatus 224 to obtain an instruction to update firmware for the image forming apparatus 100 (step S601) and obtains, from the server apparatus 224, combination information on version information on each piece of firmware before update, TSF information (characteristic information), and information on the dependency relationship among firmware (FIG. 7A) (step S602) (first obtaining unit).

Figure 7A:
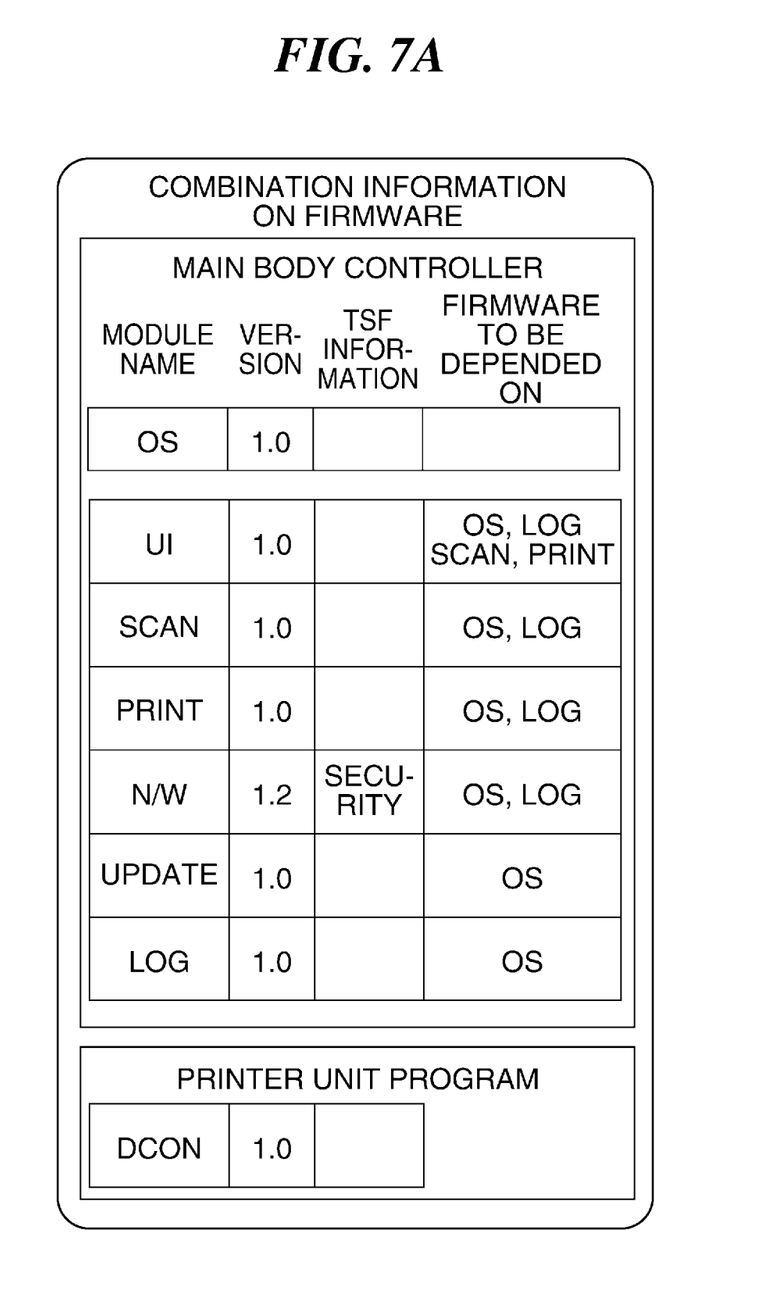
FIG. 7A shows combination information on firmware before update.

The information on the dependency relationship among firmware means information indicative of the relationship among firmware in terms of use. In FIG. 7A, for example, the N/W module 405 uses functions of the OS module 401 and the log module 407, and hence the N/W module 405 has the dependency relationship with "the OS module 401" and "the log module 407".

The CPU 210 then obtains combination information on version information on each piece of update firmware, TSF information, and information on the dependency relationship among firmware (FIG. 7B) from the server apparatus 224 (step S603) (first obtaining unit) and compares the combination information on firmware before update obtained in the step S602 with the combination information on update firmware obtained in the step S603 to identify update firmware having a difference in version information on firmware as firmware likely to be updated (step S604) (identifying unit).

The CPU 210 obtains update firmware required to update firmware likely to be updated, which was identified in the step S604, from the server apparatus 224 (second obtaining unit) and stores the obtained update firmware in the image forming apparatus 100 (for example, the HDD 213) (step S605). Then, based on the combination information on update firmware obtained in the step S603, the CPU 210 determines whether or not the firmware likely to be updated is firmware having TSF information (step S606) (determination unit).

As a result of the determination in the step S606, when firmware likely to be updated is firmware having TSF information (YES in the step S606), the CPU 210 causes the operating unit 210 to display the UI (FIG. 5) indicating that the secure state will not be maintained and prompting the user to choose whether or not to update firmware (step S607) (display control unit), and determines whether or not the user has issued an instruction to update firmware via the operating unit 219 (step S608). In the step S608, the instruction to update firmware is issued by the user depressing the update button 501 or the cancel button 502 (FIG. 5) to choose whether to update firmware or cancel firmware update.

As a result of the determination in the step S608, when the user has issued an instruction to cancel firmware update by depressing the cancel button 502 (NO in the step S608), the CPU 210 deletes the update firmware obtained in the step S605 and cancels firmware update (step S609), followed by terminating the present process.

On the other hand, as a result of the determination in the step S606, when firmware likely to be updated is not firmware having TSF information (NO in the step S606), the CPU 210 determines whether or not the firmware likely to be updated has a dependency relationship with firmware having TSF information based on the combination information on update firmware obtained in the step S603 (step S610) (dependency relationship determination unit).

Figure 7B:
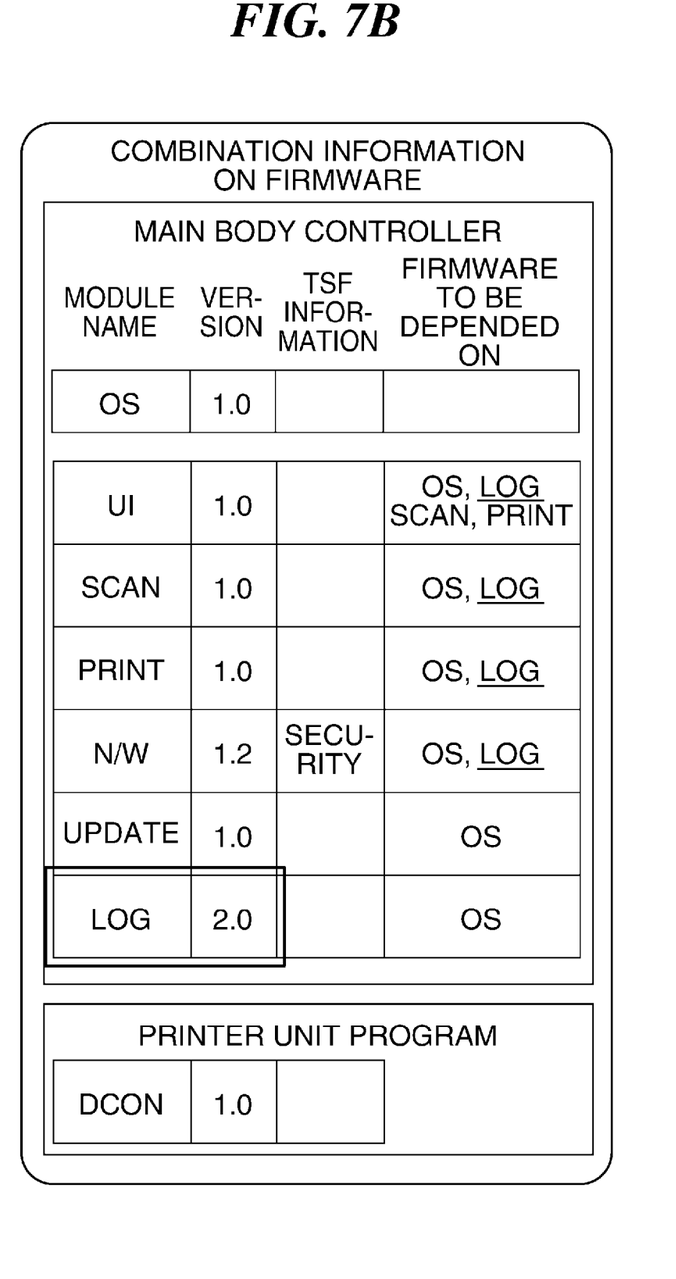
FIG. 7B shows combination information on update firmware when firmware having TSF information is for update.

In the identification in the step S604 and the determination in the step S606, when, for example, combination information on update firmware in FIG. 7B is used, the CPU 210 compares in the step S604 the combination information on firmware before update (FIG. 7A) with the combination information on update firmware (FIG. 7B). Since version information on the log module 407 is different, i.e. 1.0 and 2.0, the CPU 210 identifies the log module 407 having a difference in version information as firmware likely to be updated.

Further, in the step S610, since combination information on update firmware (FIG. 7B) shows that firmware having a dependency relationship with the N/W module 405 which is firmware having TSF information are the OS module 401 and the log module 407, the CPU 210 determines that the log module 407 which is firmware likely to be updated has a dependency relationship with firmware having TSF information.

Figure 7C:
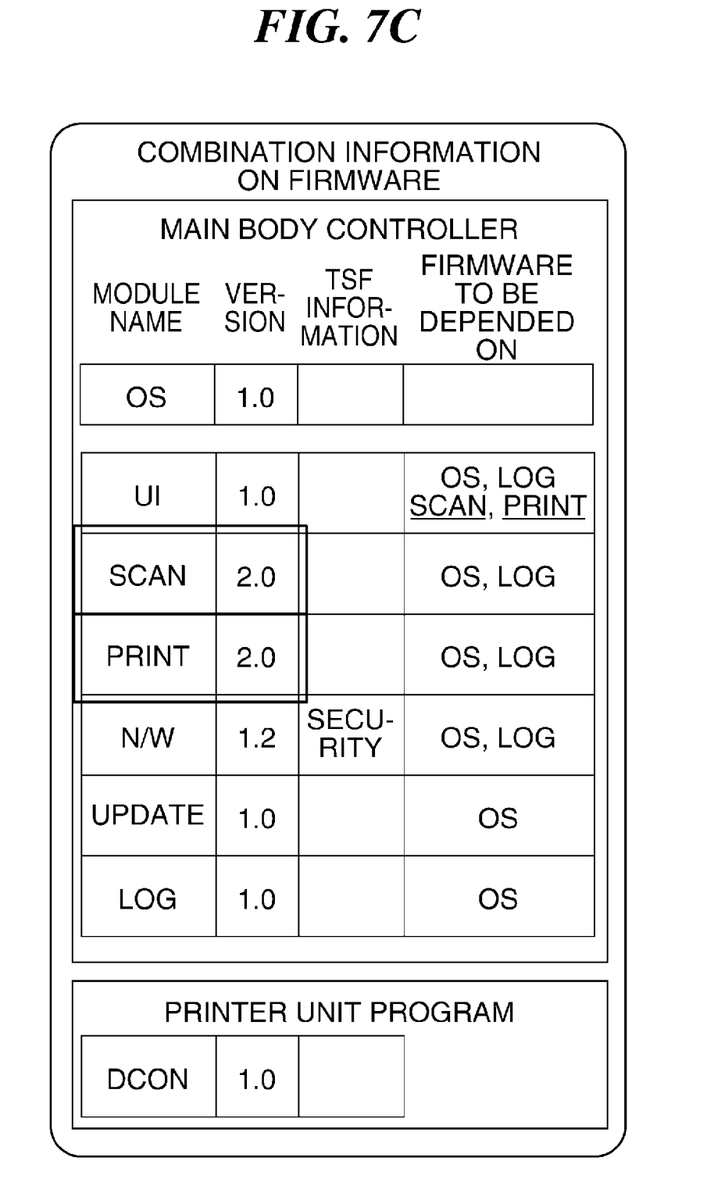
FIG. 7C shows combination information on update firmware when firmware having TSF information is not for update.

Moreover, in the identification in the step S604 and the determination in the step S610, when, for example, combination information on update firmware in FIG. 7C is used, the CPU 210 compares in the step S604 the combination information on firmware before update (FIG. 7A) with the combination information on update firmware (FIG. 7C). Since version information on the scan module 403 and the print module 404 is different, i.e. 1.0 and 2.0, the CPU 210 identifies the scan module 403 and the print module 404 having a difference in version information as firmware likely to be updated.

Further, in the step S610, since the combination information on update firmware (FIG. 7C) shows that firmware having a dependency relationship with the N/W module 405 which is firmware having TSF information are the OS module 401 and the log module 407, the CPU 210 determines that neither the scan module 403 nor the print module 404 which are firmware likely to be updated has a dependency relationship with firmware having TSF information.

As a result of the determination in the step S608, when the user has issued an instruction to update firmware by depressing the update button 501 (YES in the step S608), or as a result of the determination in the step S610, when the firmware likely to be updated does not have a dependency relationship with firmware having TSF information (NO in the step S610), the CPU 210 causes the OS module 401 to execute the update module 406 and updates firmware before update which corresponds to update firmware having a difference in version information among firmware before update to the update firmware obtained in the step S605 (step S611) (update unit), followed by terminating the present process.

It should be noted that in the process in FIG. 6, when firmware likely to be updated is not firmware having a dependency relationship with firmware having TSF information (NO in the step S610), the CPU 210 may cause the operating unit 219 to indicate that the secure state will not be maintained and perform a firmware update in the step S611.

As a result of the determination in the step S610, when the firmware likely to be updated has a dependency relationship with firmware having TSF information (YES in the step S610), the CPU 210 causes the operating unit 219 to display the UI (FIG. 5) indicating that the secure state will not be maintained and prompting the user to choose whether or not to update firmware (step S607) (display control unit) and carries out the processes in the step S608 and the subsequent steps, followed by terminating the present process.

According to the process in FIG. 6, when firmware likely to be updated is firmware having TSF information or firmware having a dependency relationship with firmware having TSF information (YES in the step S606 or YES in the step S610), the CPU 210 causes the operating unit 219 to display the UI (FIG. 5) indicating that the secure state will not be maintained and prompting the user to choose whether or not to update firmware (step S607). This prevents firmware from being updated to firmware with wrong specifications irrespective of firmware specifications.

Although in the present embodiment, the determination based on TSF information on firmware is made, the determination based on characteristic information or the like with functions added for specific users may be made.

Although in the present embodiment, combination information on update firmware is obtained (the step S303 or S603) and update firmware is obtained (the step S305 or S605) from the server apparatus 224, they may be obtained from the external USB device 223 (such as a USB memory), the PC 225, and so on.

Although in the present embodiment, combination information on firmware before update and combination information on update firmware are compared with each other, and update firmware having a difference in version information on firmware is identified as firmware likely to be updated (the step S304 or S604), the above combination information may be compared with each other to identify firmware before update which has a difference in version information on firmware may be identified as firmware likely to be updated.

Although in the present embodiment, firmware likely to be updated is identified based on combination information on firmware which is obtained from the server apparatus 224, firmware likely to be updated may be identified based on combination information created by the user, or firmware likely to be updated may be identified based on the latest combination information without being based on an instruction from the user.

It should be noted that the combination information created by the user via the operating unit 219 showing information on firmware obtained from the server apparatus 224.

Moreover, although in the present embodiment, update firmware is obtained in the step S305 or S605, update firmware may be obtained when a firmware update is performed in the step S310 or S611.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-003220, filed Jan. 10, 2014, which is hereby incorporated by reference herein in its entirety.

What is claimed is:

1. An image forming apparatus, comprising:
a network interface; and
a processor configured to:
receive instructions to perform a firmware update;
obtain version information of a plural of pieces of firmware currently installed on the image forming apparatus;
obtain version information of update firmware corresponding to each of the plural pieces of firmware via the network interface;
identify a update firmware having a version difference from one of the plural pieces of firmware;
obtain the update firmware via the network interface;
determine whether the one of the plural pieces of firmware to be updated has characteristic information regarding TSF;
display a prompt to the user to choose whether to perform the update, wherein the prompt has a message indicating that the characteristic information regarding TSF will not be maintained if the update is performed; and
update the one of plural pieces of firmware with the obtained update firmware in accordance with the user selecting to perform the update on the prompt.

2. The image forming apparatus according to claim 1, wherein, in a case where the one of the plural pieces of firmware to be updated does not have the characteristic information regarding TSF, firmware corresponding to the update firmware having a difference in terms of the version information among the plural pieces of firmware is updated to the obtained update firmware.

3. The image forming apparatus according to claim 1, wherein the information processing apparatus has information on dependency among the update firmware,
the processing circuitry is further configured to cause the image forming apparatus to:
obtain the information on dependency on the update firmware obtained from the information processing apparatus; and
based on the obtained information on the dependency, determine whether the one of the plural pieces of firmware to be updated has dependency on firmware having the characteristic information regarding TSF;
wherein, in a case where the one of the plural pieces of firmware to be updated has dependency on firmware having the characteristic information regarding TSF, the display screen is controlled to indicate that the characteristic information regarding TSF will not be maintained and prompt the user to choose whether to perform the update by the update firmware.

4. The image forming apparatus according to claim 3, wherein, in a case where the one of the plural pieces of firmware to be updated does not have dependency on firmware having the characteristic information regarding TSF, the one of the plural pieces of firmware to be updated is updated.

5. A control method for an image forming apparatus having a network interface and processor configured to perform the method comprising:
receiving instructions to perform a firmware update;
obtaining version information of a plural pieces of firmware currently installed on the image forming apparatus;
obtaining version information of update firmware corresponding to each of the plural pieces of firmware via the network interface;
identifying a update firmware having a version difference from one of the plural pieces of firmware;
obtaining update firmware via the network interface;
determining whether the one of the plural pieces of firmware to be updated has characteristic information regarding TSF;
displaying a prompt to the user to choose whether to perform the update, wherein the prompt has a message indicating that the characteristic information regarding TSF will not be maintained if the update is performed; and updating the one of plural pieces of firmware with the obtained update firmware in accordance with the user selecting to perform the update on the prompt.

6. A non-transitory computer-readable storage medium storing a program for causing a computer to execute a control method for an image forming apparatus having a network interface, the control method comprising:

receiving instructions to perform a firmware update;

obtaining version information of a plural of pieces of firmware currently installed on the image forming apparatus;

obtaining version information of update firmware corresponding to each of the plural pieces of firmware via the network interface;

identifying a update firmware having a version difference from the one of the plural pieces of firmware:

obtaining update firmware via the network interface;

determining whether the one of the plural pieces of firmware to be updated has characteristic information regarding TSF;

displaying a prompt to the user to choose whether to perform the update, wherein the prompt has a message indicating that the characteristic information regarding TSF will not be maintained if the update is performed; and updating the one of plural pieces of firmware with the obtained update firmware in accordance with the user selecting to perform the update on the prompt.

* * * * *